(12) United States Patent
Noyon

(10) Patent No.: US 9,463,923 B2
(45) Date of Patent: Oct. 11, 2016

(54) PIPE-CLOSING DEVICE FOR ISOLATING A TANK, A PIPE OR A SET OF TANKS AND PIPES

(71) Applicant: ELECTRICITE DE FRANCE, Paris (FR)

(72) Inventor: Emmanuel Noyon, Magneville (FR)

(73) Assignee: ELECTRICITE DE FRANCE, Paris (FR)

( * ) Notice: Subject to any disclaimer, the term of this patent is extended or adjusted under 35 U.S.C. 154(b) by 0 days.

(21) Appl. No.: 14/781,879

(22) PCT Filed: Oct. 4, 2013

(86) PCT No.: PCT/EP2013/070716
§ 371 (c)(1),
(2) Date: Oct. 1, 2015

(87) PCT Pub. No.: WO2014/161612
PCT Pub. Date: Oct. 9, 2014

(65) Prior Publication Data
US 2016/0031638 A1  Feb. 4, 2016

(30) Foreign Application Priority Data

Apr. 3, 2013  (FR) ...................................... 13 52998

(51) Int. Cl.
*F16L 55/10* (2006.01)
*B65D 90/10* (2006.01)
(Continued)

(52) U.S. Cl.
CPC ................ *B65D 90/10* (2013.01); *F16L 55/11* (2013.01); *F16L 55/136* (2013.01); *F22B 37/221* (2013.01); *G01M 3/022* (2013.01); *G01M 3/2815* (2013.01); *F16L 2101/30* (2013.01)

(58) Field of Classification Search
CPC ... F16L 55/132; F16L 55/134; F16L 55/136; F16L 55/1283

USPC .................................. 138/89, 90, 93; 73/49.8
See application file for complete search history.

(56) References Cited

U.S. PATENT DOCUMENTS 922,544 A * 5/1909 Turner et al. .......... F16L 55/136
138/90
2,855,003 A * 10/1958 Thaxton ................ F16L 55/136
138/90

(Continued)

*Primary Examiner* — Patrick F Brinson
(74) *Attorney, Agent, or Firm* — Blakely Sokoloff Taylor & Zafman LLP

(57) ABSTRACT

The invention relates to a plug for closing and isolating a pipe (9) having an inner wall forming a substantially cylindrical cavity with a so-called first diameter, the plug comprising:
 a main body (110) having substantially a shape of a cylinder with a so-called second diameter, the second diameter being smaller than the first diameter to allow the plug to be inserted into the cavity; and
 sealing joint elements (120) that project around the side wall of the cylinder (110) defining the shape of the main body, so as to seal a free space formed between the main body (110) and the inner wall of the pipe (9),
in which the main body (110) comprises several assembly elements forming the cylinder (110), each assembly element having a shape inscribed within a parallelepiped volume defined by three orthogonal dimensions, where at least two of the three dimensions have a length smaller than the second diameter, and the plug further comprising a position holding system comprising several non-slip pads (140; 340) deployable in order to assure a holding of the plug by compression, the set of non-slip pads forming an overall contact surface extending over at least half of the periphery of the section of the cylinder (110).

16 Claims, 5 Drawing Sheets

(51) Int. Cl.
*F16L 55/11* (2006.01)
*F16L 55/136* (2006.01)
*G01M 3/02* (2006.01)
*F22B 37/22* (2006.01)
*G01M 3/28* (2006.01)
*F16L 101/30* (2006.01)

(56) References Cited

U.S. PATENT DOCUMENTS

| | | | | |
|---|---|---|---|---|
| 3,228,678 A * | 1/1966 | Koger | ................ | B29C 57/06 138/109 |
| 3,933,180 A * | 1/1976 | Carter | ................ | B29C 70/16 138/130 |
| 5,032,350 A | 7/1991 | McDonald et al. | | |
| 6,732,762 B2 * | 5/2004 | Russell | ................ | F16L 55/136 138/89 |
| 7,240,697 B2 * | 7/2007 | Beebe | ................ | F16L 55/134 138/89 |
| 8,042,574 B2 * | 10/2011 | Mellemstrand | ..... | F16L 55/1283 138/89 |
| 8,955,551 B2 * | 2/2015 | Carson | ................ | F16L 55/11 138/89 |
| 2005/0241710 A1 * | 11/2005 | Early | ................ | F16L 55/1283 138/89 |
| 2005/0241711 A1 * | 11/2005 | Sayers | ................ | F16L 55/1141 138/89 |
| 2006/0086400 A1 | 4/2006 | Beebe et al. | | |
| 2008/0299086 A1 * | 12/2008 | Kanzaki | ................ | C12M 21/08 424/93.7 |

* cited by examiner

PIPE-CLOSING DEVICE FOR ISOLATING A TANK, A PIPE OR A SET OF TANKS AND PIPES

FIELD OF THE INVENTION

The present invention relates to a device which makes it possible to close a pipework, a tank or a set of tank(s) and pipe(s) in order to be able to isolate them, especially with a view to maintenance, test or hydraulic pressure testing operations.

PRIOR ART

Numerous industrial installations comprise enclosures (reservoirs, tanks, exchangers, etc.) coupled to pipes (pipework) for the passage of fluids, liquid or gaseous, often under pressure. In order to guarantee a reliable and secure operation of these installations, the maintenance of such systems requires regularly carrying out leak tightness tests and the regulations for pressurised devices moreover impose carrying out hydraulic pressure testing periodically.

For carrying out leak tightness tests or hydraulic pressure testing of reservoirs, tanks, or any other type of enclosure, it is at present necessary to modify the configuration of the installation to create a test or testing "bubble", that is to say the creation of a confined space enabling the pressurisation of the enclosure with a view to its technical evaluation, especially in terms of leak tightness.

For the creation of this confined space, it is thus necessary to be able to seal each of the inlets/outlets of the tank, especially when they are coupled to a pipe, in order to isolate the internal volume of the tank.

To do so, it is possible to use the plumbing fixtures associated with the tank at the level of inlets/outlets. Nevertheless, plumbing fixtures at the level of each pipe do not in general exist. Moreover, it is in general necessary to check and assure the correct operation of each plumbing fixture before any test or hydraulic pressure testing, and to guarantee its leak tightness. Finally, the plumbing technologies generally employed on tanks are often not suited to obtain the perfect leak tightness required for a test or for hydraulic pressure testing, and the plumbing fixtures are not systematically dimensioned to withstand pressurisation during tests or hydraulic pressure testing.

When one of the pipes is not provided with such a plumbing fixture, or when said fixture is not suited for the stresses of tests or hydraulic testings, a solution consists in using a plug suited for the isolation of the tank. Nevertheless, in industries using so-called hazardous fluids (toxic, inflammable, explosive, etc.) or hot fluids (for example steam), the enclosures and pipeworks are not equipped with clamps which would have made it possible, after dismantling, to install bolted shutters (blind holes, blind clamps), enabling sealing. Thus, it is generally necessary to cut the pipe and to weld a closing means at the level of the cut section of the pipe.

Unfortunately, such a technique of sealing pipes has a large number of drawbacks. Firstly, such a solution implies a complex implementation, generating an intervention of long duration, requiring specific rare human resources (welders, controllers, etc.) and considerable needs in material logistics (gantries, scaffolding, airlock, de-lagging, etc.). The intervention also comprises risks of important implementation variables (defects, faults, etc.). Finally, the implementation of this solution on certain installations (especially those subjected to particular regulations), requires establishing specific regulatory files and carrying out specific controls, such as for example radiographic controls. These controls have, for their part, not insignificant risks from a radiation protection viewpoint and prohibit any concurrent activities.

A solution for avoiding these drawbacks linked to the use of welded plugs consists in using existing closing devices and in positioning them in the pipe to seal it. The international application published on the 20 Jan. 2000 under the reference WO 00/03172 describes a certain number of embodiments of clamp plugs intended to be positioned at the end of the pipe. Such plugs are robust and make it possible to withstand high pressures but their handling remains very complex, especially when the pipes to seal and isolate have large diameters. In the case where the diameter of the pipework to seal is greater than the diameter of the manhole of the enclosure where the pipework is connected, it is necessary to cut the pipework to introduce the plug. Moreover, the intrinsic leak tightness of such plugs cannot be checked or controlled during leak tightness tests of the duct, which can falsify the results of the test as the case may be. The important risk of damaging the pipework due to the system of prongs should also be noted.

A plug solution has also been proposed in the US patent application published on the 27 Apr. 2006 under the reference US 2006/0086400. Such a closing device makes it possible to seal and isolate a pipe to carry out leak tightness tests and the specific configuration of the plug further makes it possible to control the intrinsic leak tightness of the plug. Nevertheless, the solution proposed is not suitable for large pipe diameters, and cannot withstand the high pressures of leak tightness tests or hydraulic pressure testing. The structure of such a plug is moreover complex and massive, making its putting in place and implementation more difficult.

Moreover, all existing sealing solutions have the drawback of requiring cutting the pipe which has to be sealed to isolate the tank and thereby form the confined space necessary for the test.

An aim of the present invention is thus to propose a pipe closing device which makes it possible to resolve at least one of the aforementioned drawbacks.

In particular, an aim of the present invention is to propose a closing device which may be put in place in a pipe of an enclosure, such as a tank, without having to cut said pipe. The closing device has a final diameter after mounting greater than the diameter of the orifice of the tank through which it will have been introduced.

Another aim of the present invention is to propose a closing device which is simple to put in place, not requiring specific human skills and different to normal maintenance operations.

A further aim of the present invention is to propose a closing device being able to be arranged in pipes having a large diameter (typically greater than 1000 mm) and to be able to position the plug in any straight section of the pipework, and which is moreover suited to withstand the stresses imposed by tests or hydraulic pressure testing, especially in terms of pressure.

Yet another aim of the invention is to propose a closing device which is simple to put in place in the pipes, and for which the holding in the pipe is simple, efficient, and which can be carried out in any portion of the pipe. The closing device is sufficiently robust and maintained in position to enable pipe tests at high pressure.

DESCRIPTION OF THE INVENTION

To this end, a closing device is proposed for sealing and isolating a pipe having an inner wall forming a substantially cylindrical cavity with a so-called first diameter, the closing device comprising:
- a main body having substantially the shape of a cylinder with a so-called second diameter, the second diameter being smaller than the first diameter to allow the closing device to be inserted into the cavity; and
- sealing joint elements that project around the side wall of the cylinder defining the shape of the main body, so as to close a free space formed between the main body and the inner wall of the pipe, characterised in that the main body comprises several assembly elements capable of being assembled together to form the cylinder defining the shape of the main body, each assembly element having a shape inscribed within a parallelepiped volume defined by three orthogonal dimensions, in which at least two of the three dimensions have a length smaller than the second diameter.

The fact of having assembly elements having at least two dimensions of a length smaller than the diameter of the main cylindrical body enables the handling of these assembly parts through orifices which have smaller dimensions than the diameter of the main body, and thus smaller than the diameter of the pipe.

According to a preferred aspect, the device further comprises a position holding system comprising a plurality of non-slip pads translationally mounted in certain of the assembly elements to be deployed against the inner wall of the pipe in order to assure a holding of the closing device by compression, the set of non-slip pads forming an overall contact surface extending over at least half of the periphery of the section of the cylinder defining the shape of the main body.

The layout and the configuration of the non-slip pads guarantee a holding of the plug without requiring a complementary holding contrivance, which is particularly advantageous since this makes it possible to position the plug in any portion of pipe and not uniquely at its end.

Preferred but non-limiting aspects of this closing device, taken alone or in combination, are the following:
- the position holding system comprises force measurement elements provided to measure the force applied by the non-slip pads on the inner wall of the pipe.
- each non-slip pad is mounted on a compression system, such as a system of jacks or a screws-jacks system, comprising a blocking system preventing a translation of the non-slip pad after deployment of the non-slip pad on the inner wall of the pipe.
- the device further comprises an anti-extrusion system provided to prevent a translation of the closing device in the pipe in the event of failure of the position holding system, said anti-extrusion system comprising blocking elements arranged to be activated during a translation movement of the closing device in the pipe.
- each blocking element of the anti-extrusion system is a roller mounted eccentrically with respect to a non-slip pad of the holding system, and having a contact surface intended to be in contact with the inner wall of the pipe.
- the set of non-slip pads forms an overall contact surface extending over the totality of the periphery of the section of the cylinder defining the shape of the main body.
- the at least two dimensions among the three have a length smaller than or equal to half of the second diameter, preferably smaller than or equal to one third of the second diameter.
- the main body is segmented along chords of the circular section of the cylinder, several of the assembly elements forming circular segments of the cylinder.
- which main body is segmented along radiuses of the circular section of the cylinder, several of the assembly elements forming circular sectors of the cylinder.
- the main body is moreover segmented along the section of the cylinder so as to form several elementary cylinders the assembly of which forms the cylinder of the main body.
- the main body comprises intrinsic sealing joints, each intrinsic sealing joint being arranged between two adjacent elementary cylinders.
- the main body is segmented into at least three elementary cylinders, each elementary cylinder being segmented into at least three assembly elements.
- the different non-slip pads of the holding system are mounted in assembly elements forming one of the elementary cylinders.
- the sealing joint elements comprise at least two inflatable sealing joints intended to be positioned around the cylinder forming the main body.
- the device further comprises an instrumentation system provided to command and control the pressure in the inflatable sealing joints and in each inter-joint space formed between two adjacent inflatable sealing joints and the walls of the main body and the duct.
- each assembly element has a honeycomb structure.

According to a particular aspect, this closing device is used in a tank having a manhole for handling assembly elements, the manhole having a diameter comprised between 400 mm and 600 mm, with a view to sealing a pipe having a diameter comprised between 1000 mm and 2000 mm.

DESCRIPTION OF THE FIGURES

Other characteristics and advantages of the invention will become clearer from the description that follows, which is purely illustrative and non-limiting and should be read with regard to the appended drawings, in which.

DETAILED DESCRIPTION OF THE INVENTION

Figure 1:
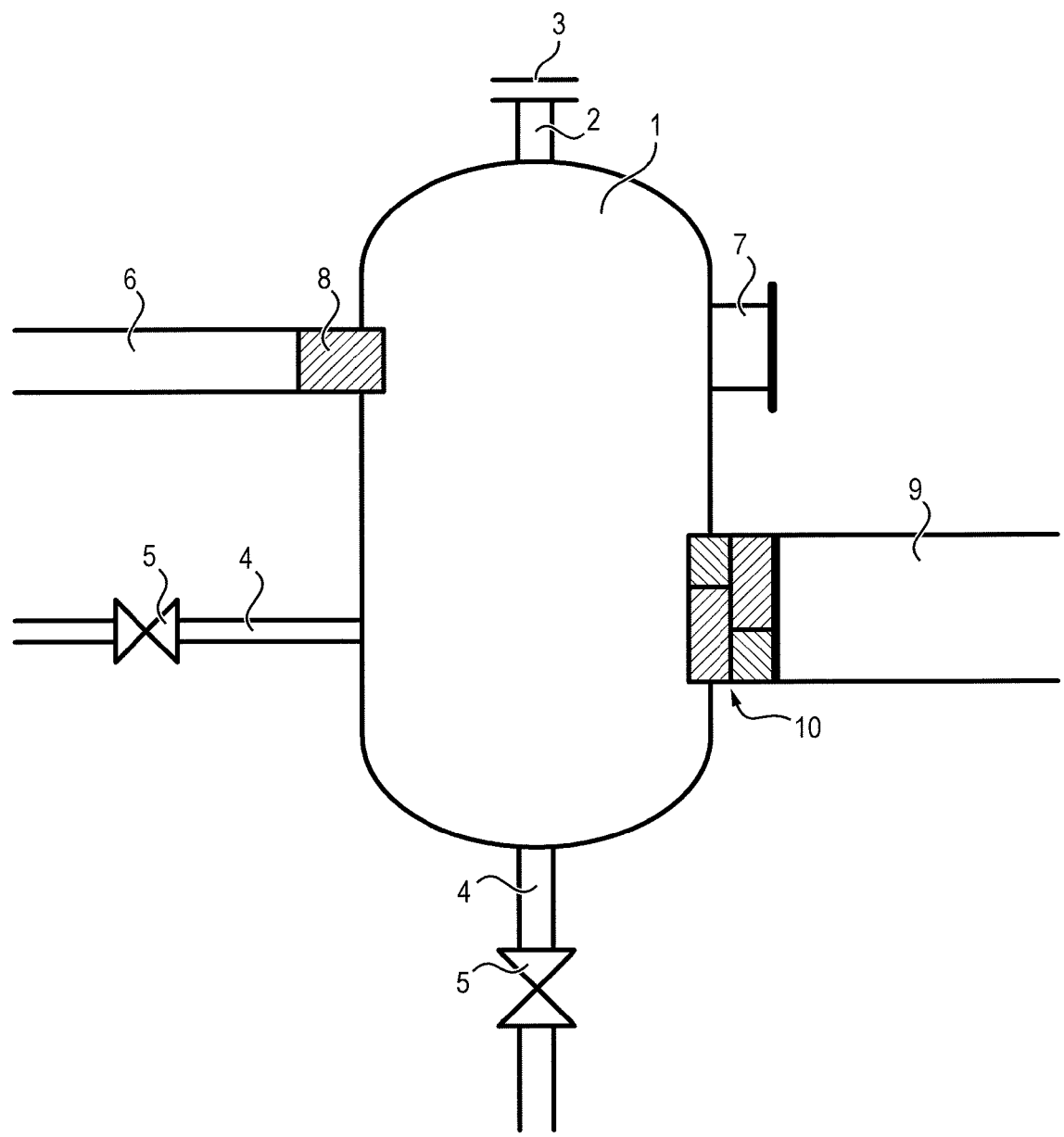
FIG. 1 is a schematic view of a tank comprising several pipes provided with different types of plugs.

In FIG. 1 is illustrated an enclosure such as a tank 1 which could be used in any type of industrial installation, such as for example inside a nuclear power plant, in order to channel and store a fluid, in liquid or gaseous form. This tank 1 comprises several inlets/outlets, generally connected to pipes enabling the circulation of the fluid to or from said tank 1. The tanks may have highly varied dimensions and associated volume, but they have in general an internal volume comprised between 2 and 800 m³, being able in this latter case to have a length of the order of 30 m for a diameter of 6 m.

FIG. 1 further illustrates different solutions for closing said inlets/outlets, and especially highlights the existing solutions of the prior art described above.

Thus, the tank 1 comprises a pipe 2 having a mounting clamp on which it is possible to fix a blind hole 3 making it possible to seal said pipe 2.

Also represented are two pipes 4 provided with valves 5, permanently present, especially for the regulation of the flow of fluid, and which may thus be used to close these pipes 4 and isolate the internal volume of the tank 1.

The pipe 6 is in one piece with the tank 1 and thus cannot be isolated by a valve or by a blind hole without having to section this pipe 6. It is thus necessary to position a specific plug inside the pipe 6 to be able to seal and thus isolate the inner volume of the tank 1. A pipe is in particular qualified as "in one piece" when it has been welded to an inlet/outlet of the tank 1 with the appropriate controls.

The tank 1 furthermore comprises a manhole 7, that is to say an opening, generally circular, the dimensions of which enable someone to enter inside the tank 1. Such a manhole 7 may have a nominal diameter comprised between 400 mm and 600 mm, preferably of the order of 500 mm.

If the pipe 6 has an internal diameter smaller than the diameter of the manhole 7, it is possible to make a plug 8 suited to the diameter of the pipe 6 penetrate into the cavity inside the tank 1 through the manhole 7 which is sufficiently large. It is advisable nevertheless that this plug 8 is suited to the physical stresses, especially in terms of pressure, imposed by the tests or hydraulic pressure testing to be carried out on the tank 1. It is clearly obvious that this sealing route is not possible with known plugs when the diameter of the pipe 9 is greater than the diameter of the manhole 7. The pipes can in fact have a diameter greater than 700 mm, for example comprised between 1000 mm and 2000 mm, for example of the order of 1400 mm to 1500 mm.

A multi-element closing device 10, which can be dismantled, is proposed here, each assembly element making it up having dimensions enabling it to be introduced inside the tank 1 through the manhole 7, and the closing device 10 having—when all the assembly elements are mounted together—dimensions substantially equal to the internal dimensions of the pipe 9.

Thus, the multi-element closing device 10 is a plug designed to be firstly introduced into the tank 1 or any other type of enclosure, and then to be assembled in or around the pipework 9 to seal.

To do so, the plug 10 comprises a plurality of assembly elements which, once assembled together, form a main body 110 having substantially the shape of a cylinder with a diameter smaller than the diameter of the pipe 9 to allow the closing device to be inserted into the cavity of the pipe 9. Moreover, sealing joint elements 120 project around the side wall of the main body 110, so as to seal the free space formed between the main body 110 and the inner wall of the pipe 9.

In order to be able to introduce the plug 10 into the tank 1, it is necessary that the assembly elements have at least two dimensions of which the length is smaller than the diameter of the manhole 7. Since the pipe diameters of the tank 1 are able to be up to two to three times greater than that of the manhole 7, the two dimensions of the assembly elements may have a length smaller than or equal to half of the diameter of the pipe 9, preferably smaller than or equal to one third of this diameter.

The segmentation of the main body 110 of the plug 10 is optimised to form easy to handle assembly elements, and enabling a simple mounting of the plug from the inside of the tank 1.

Preferably, the main body 110 is segmented along chords of the circular section of the cylinder, parallel to one of the diameters of the circle or going through the centre (the chord in question then corresponds to a diameter).

When the main body 110 is segmented along chords parallel to one of the diameters of the circle, several of the assembly elements form circular segments of the cylinder.

When the main body 110 is segmented along diameters or radiuses of the circle, several of the assembly elements form circular sectors of the cylinder.

When the cylinder forming the main body 110 is long, especially when its length is greater than the diameter of the manhole 7, the main body 110 may also be segmented along the section of the cylinder so as to form several elementary cylinders the assembly of which forms the cylinder of the main body.

Figure 2:
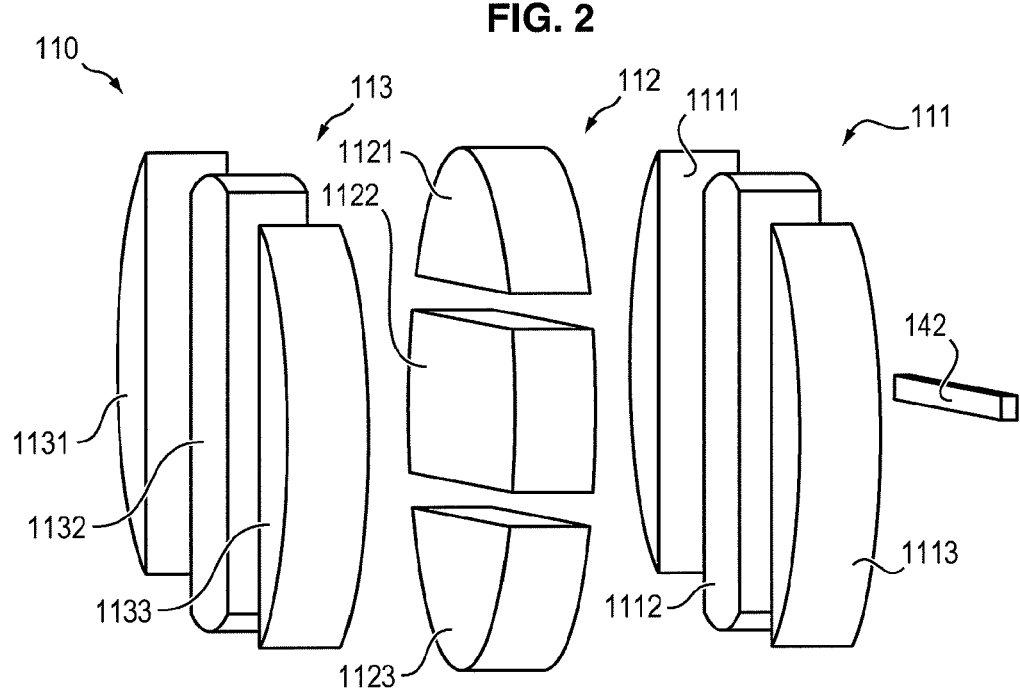
FIG. 2 is a schematic representation of the structure of the main body of the plug according to an embodiment of the invention.

FIG. 2 illustrates a preferred segmentation for the main body 110 of the plug 10. According to this embodiment, the plug 10 is segmented into three elementary cylinders (111; 112;113), each elementary cylinder (111;112;113) being segmented into three assembly elements (1111,1112,1113; 1121,1122,1123; 1131,1132,1133).

According to the embodiment illustrated in FIG. 2, it may be noted that each elementary cylinder (111;112;113) is segmented along two chords, breaking down the assembly elements into two circular segments (1111,1113; 1121,1123; 1131,1133) and a central segment (1112;1122;1132) along a diameter of the cylinder.

Figure 7:
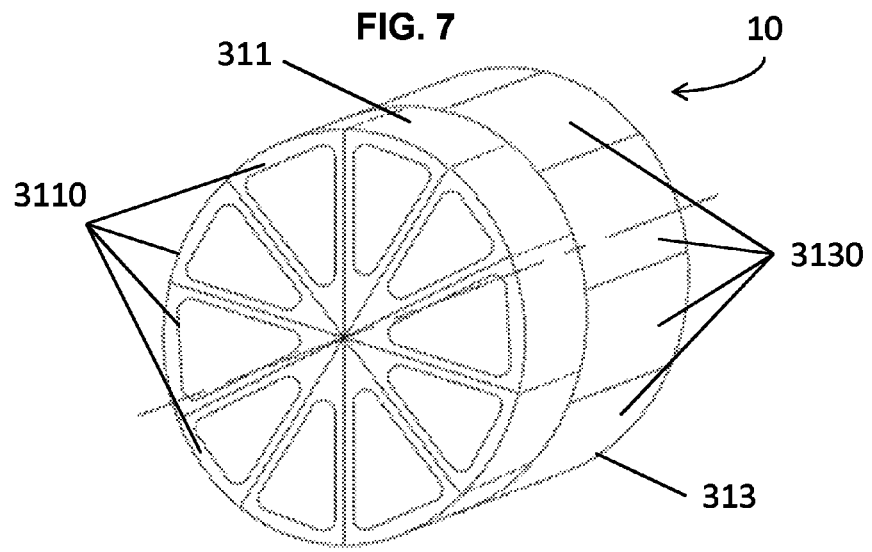
FIG. 7 is a perspective view of the plug of FIG. 5.

Another possible segmentation is illustrated in FIG. 7, where the plug 10 is segmented into several elementary cylinders, each elementary cylinder being segmented along radiuses, into assembly elements being circular sectors. In the particular example illustrated in this figure, the plug 10 comprises two elementary cylinders (311;313), each elementary cylinder being formed of ten assembly elements in the form of circular sectors (3110;3130).

Each assembly element making up the structure of the main body is designed so as to obtain the best mass/resistance compromise. It is possible for example to opt for a honeycomb structure. The material used is also chosen in order to optimise this compromise, and for example the assembly elements could be manufactured from metal (stainless steel or titanium for example) or made of composite materials. Preferably, the weight of each part forming the plug is limited to 25 kg to facilitate its manual handling.

Moreover, the plug 10 may comprise intrinsic sealing joints 130, each intrinsic sealing joint 130 being arranged between two adjacent elementary cylinders to assure the overall leak tightness of the main body 110. Such intrinsic sealing joints 130 may for example be disc and/or torus shaped, made of a leak tight material such as for example neoprene.

Moreover, the sealing joint elements 120 of the plug 10 comprise preferably at least two inflatable sealing joints 120, for example O-rings or lip seals, intended to be positioned around the cylinder forming the main body 110.

These inflatable sealing joints 120 make it possible not only to assure the total leak tightness of the plug 10, but also to compensate geometric or surface defects of the inner wall of the pipe.

Such inflatable sealing joints 120 may be positioned for example in annular grooves formed by the assembly of the assembly elements. An annular groove on one or more elementary cylinders may in this respect be provided. It may also be provided that the annular groove is formed by the assembly of two adjacent elementary cylinders. In this latter case, the inflatable sealing joint 120 moreover has the advantage of contributing to the intrinsic leak tightness of the plug 10 since it reinforces the leak tightness between two adjacent elementary cylinders.

Moreover, the layout with at least two inflatable sealing joints 120 makes it possible to create a space—called inter-joint space—formed by two adjacent inflatable sealing joints and the walls of the main body and the duct. By pressurising this inter-joint space, it is possible to check the intrinsic leak tightness of the plug 10 and to guarantee the successful conduct of the test of the tank 1. In this respect, it is possible for example to provide a pressure sensor arranged to measure the pressure within this inter-joint space.

This layout thus makes it possible to check the intrinsic leak tightness of the plug 10 when it has been positioned in the pipe 9. Moreover, with a specific monitoring system, it is possible to check the leak tightness of the plug also during the test, once the confined space is under pressure. Thus, in the event of a leak during the filling or the testing of the tank 1, it is possible to check whether it stems in all or part from the plug, and feeding back the measured leak by monitoring the pressure at the level of the inter-joint space in the results of the tank test.

Figure 3:
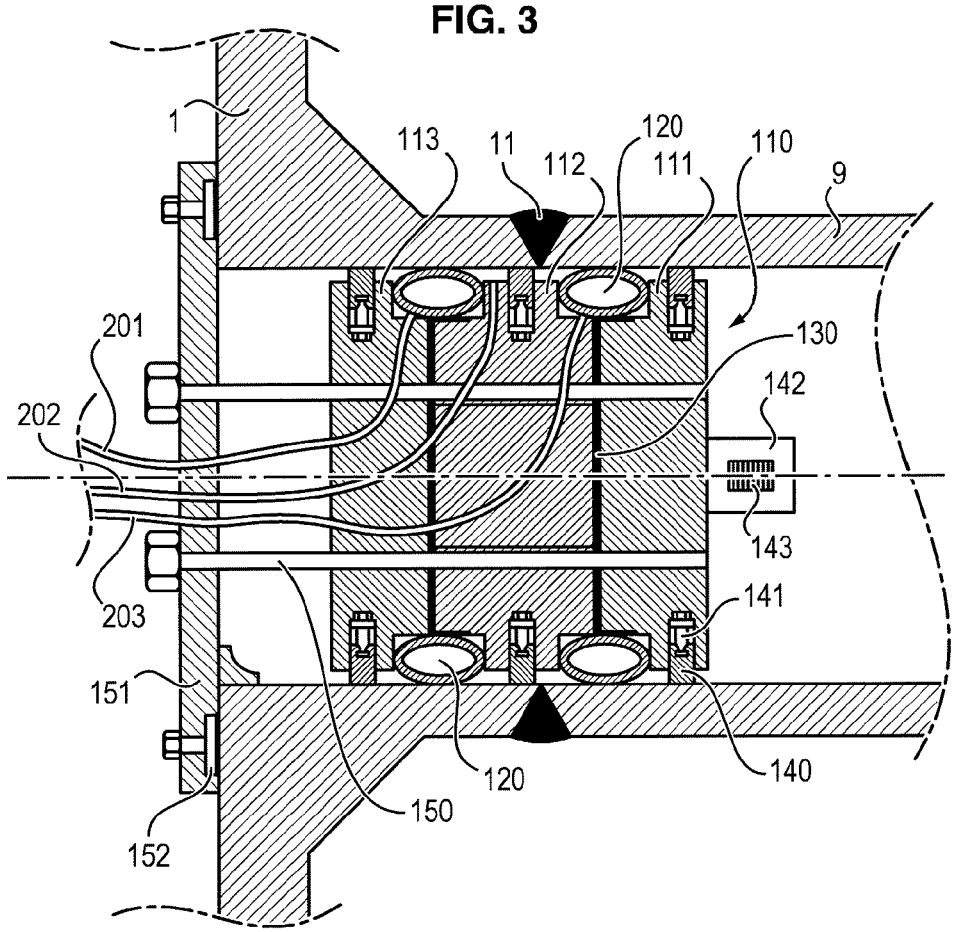
FIG. 3 is a sectional view of the plug according to a first embodiment of the invention placed inside a pipe to be sealed.

Generally speaking, there exists a connection point between the inlet/outlet of the tank 1 and the associated pipe 9, such as for example a weld 11 as illustrated in FIG. 3. Preferably, the plug 10 is placed upstream of the weld 11, to avoid having to test it with a view to testing of the tank 1. In the case where the length of the inlet/outlet pipe of the tank 1 is not long enough to receive the plug, it may be advantageous to position the inter-joint space of the plug 10 opposite the connection point 11, so as to be able to pressurise the weld via the inter-joint control line.

Figure 4:
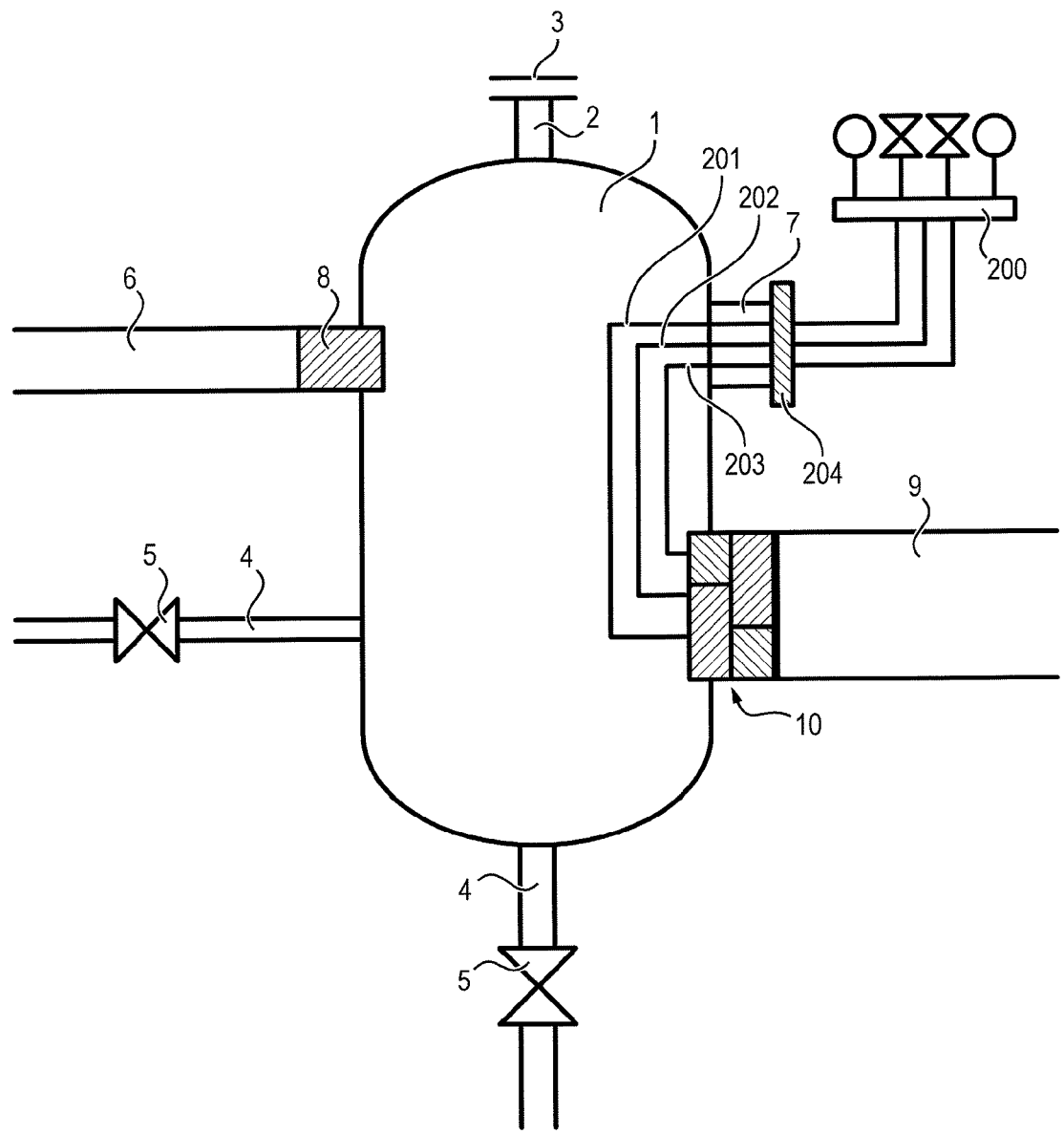
FIG. 4 is a schematic view of a tank comprising the plug according to the invention with an instrumentation system.

For the initial and/or continuous control of the leak tightness of the plug 10, a console 20 may be provided installed outside of the confined test or testing space, as illustrated in FIG. 4. This control console comprises instrumentation lines (201;202;203) connected to the inflatable sealing joints 120 and to the inter-joint space to command and control the corresponding pressure. These instrumentation lines (201;202;203) may for example pass through the honeycombs formed in the assembly elements, and come out of the tank 1 at the level of the manhole 7 to be connected to the control console 20. The passage at the level of the manhole may be achieved thanks to a test cover 204 making it possible to seal the manhole while enabling the passage of instrumentation lines.

The multi-element closing device 10 further comprises non-slip pads which make it possible to block the plug in the pipe 9, thus enabling its installation in any straight part of a section of pipework connected to the volume to test. In fact, each non-slip pad is mounted on the main body 110 so as to be able to be forced against one of the inner walls of the pipe 9. The pads are preferably designed with a material of a hardness smaller than that of the material of the pipework in order not to mark the latter. For example it may be possible to choose non-slip pads made of neoprene, or even made of metal of lower hardness.

Each non-slip pad may further be coupled to a force measuring system, for example of force sensor or load pin type, so as to control with precision the stress applied by the non-slip pad on the inner wall of the pipe 9. This control makes it possible both to guarantee that the force is sufficient to maintain the plug in place in the pipe, but also to ensure that the stress applied by the non-slip pad on the pipe 9 is not going to deteriorate it.

The contact surface between the non-slip pad and the inner wall of the pipe is preferably quite significant, in order to maximise the holding of the plug 10 in the pipe 9. Preferably, the set of non-slip pads forms an overall contact surface extending over at least half of the periphery of the section of the cylinder 110 defining the shape of the main body, and which corresponds substantially to the periphery of the cylinder section of the inner wall of the pipe 9.

Also in a preferred manner, the overall contact surface of the non-slip pads extends over at least 70%, or at least 80%, or at least 90% of the periphery of the section of the cylinder 110 defining the shape of the main body.

According to yet another preferred embodiment, the overall contact surface of the non-slip pads extends over the totality of the periphery of the section of the cylinder 110 defining the shape of the main body.

The pads are preferably interchangeable.

Preferably, the forces on the pads 140 are applied by compression means, such as a system of jacks or a screws-jacks system 141, which make it possible to force the pads 140 against the inner walls of the pipe 9, or to move them away when the plug 10 has to be removed.

Also preferably, these pads 140 are integral with the jacks or screws-jacks 141 by means of a "ball and socket" type connection in order to be able to exert either a compressive stress, or a tensile stress.

In the embodiment illustrated in FIG. 3, the non-slip pads 140 are each mounted on a screws-jack system 141. They enable an overall holding of the plug in the pipe.

Tie-rods 150 may complete the retaining of the plug 10 if this proves to be necessary. These tie-rods 150 are themselves connected to a system of support flange(s) 151 provided with adjustable support pads 152, preferably non-slip. The plug is nevertheless designed to counter the forces due to pressure without the use of tie-rods. The adherence of the non-slip pads and the forces that are applied thereto are sufficient.

A centring rod 142 also provided with non-slip pads 143 at its ends may also be provided, this centring rod 142 facilitating the installation of the first assembly elements in the pipe.

Figure 5:
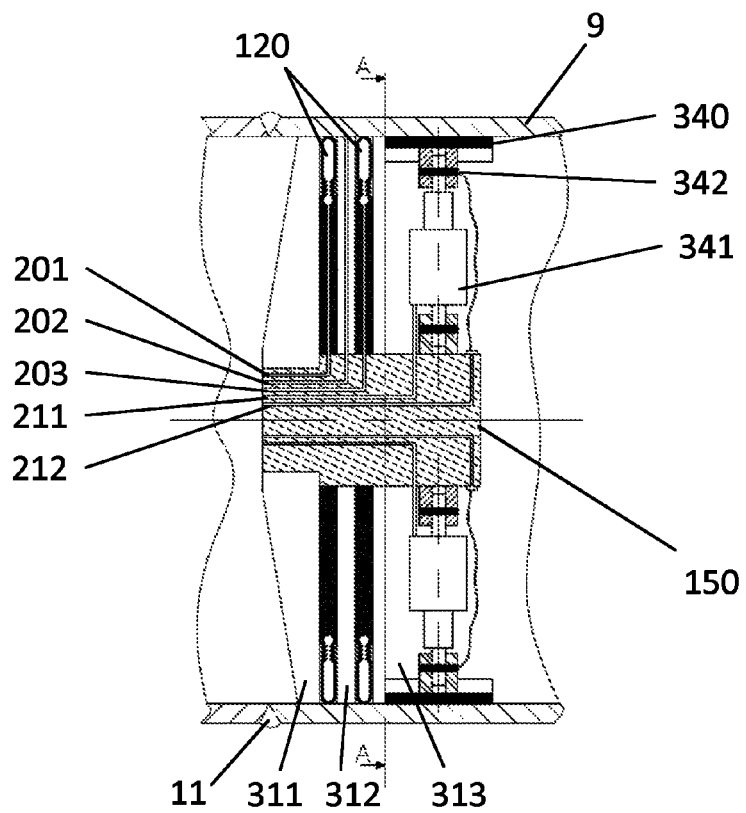
FIG. 5 is a sectional view of the plug according to a second embodiment of the invention placed inside a pipe to be sealed.
Figure 6:
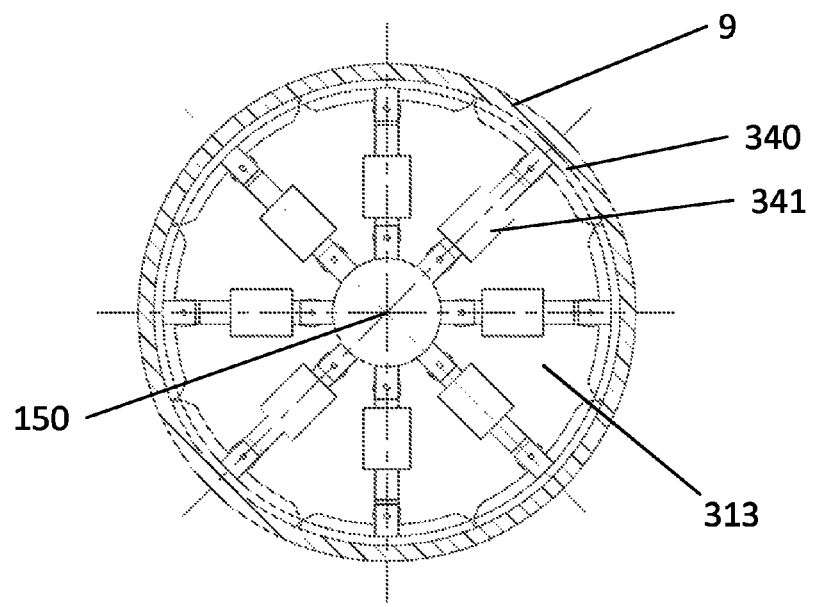
FIG. 6 is a view of the plug of FIG. 5 along the plane A-A, representing the position holding device.

In the embodiment illustrated in FIGS. 5 and 6, the non-slip pads 340 are each mounted on a jack system 341.

Each non-slip pad 340 is moreover coupled to a force sensor 342 which makes it possible to control with precision the deployment and the stressing of the non-slip pad 340 in the pipe 9.

The compression means and the force measurement means, being respectively a jack 340 and a force sensor 342 in the example of FIGS. 5 and 6, may moreover be coupled to the control console by dedicated instrumentation lines (211;212).

The jack 341 used may further integrate a blocking system preventing, once the pad 340 has been deployed against the inner wall of the pipe 9, a translation of said non-slip pad 340 towards a retraction (that is to say in the opposite sense of the deployment). Such a blocking system is especially provided to avoid any release of the stress in the event of pressure loss in the jack 341.

In the embodiment illustrated in FIGS. 5 and 6, the position holding system comprises several non-slip pads 340 which are arranged so that their contact surface extends substantially over the totality of the periphery of the section of the cylinder defining the plug.

In the example illustrated in FIG. 6, there are eight non-slip pads 340, of which the surface of each pad extends over around 45°.

Each non-slip pad 340 with its deployment system integrating especially a jack 341 and a force sensor 342, form an assembly element 3130 of circular sector type. Once assembled through the intermediary of a central axis 150, these assembly elements 3130 integrating the non-slip pads 340 form an elementary cylinder 313 of the closing device.

The closing device furthermore comprises at least one other elementary cylinder 311 integrating the sealing joints 120. As illustrated in FIG. 7, the elementary cylinder 311 may be formed of a plurality of circular sectors 3110, which may for example be honeycomb structures.

The example of FIG. 5 highlights a structure with three elementary cylinders (311;312;313), the sealing joints 120 being arranged between the different elementary cylinders.

As indicated above, the specific layout of the non-slip pads 340 makes it possible to assure a holding of the plug in the pipe 9, without the aid of a complementary holding. This is particularly advantageous since it makes it possible to position the plug at any position inside a straight portion of pipe, and not uniquely at the end of the pipe as is generally the case in plugs of the prior art where a flange positioned outside of the pipe is necessary to assure the holding in position.

According to a preferred embodiment, the plug may further comprise an anti-extrusion system provided to prevent a translation of the closing device in the pipe in the event of failure of the position holding system, in particular if the one or more of the non-slip pads 340 are no longer forced against the inner wall of the pipe 9.

More precisely, the anti-extrusion system comprises blocking elements which are provided to be activated as soon as the plug has a slight translation movement in the pipe 9, which could happen if the holding system with the non-slip pads 340 is faulty.

Figure 8:
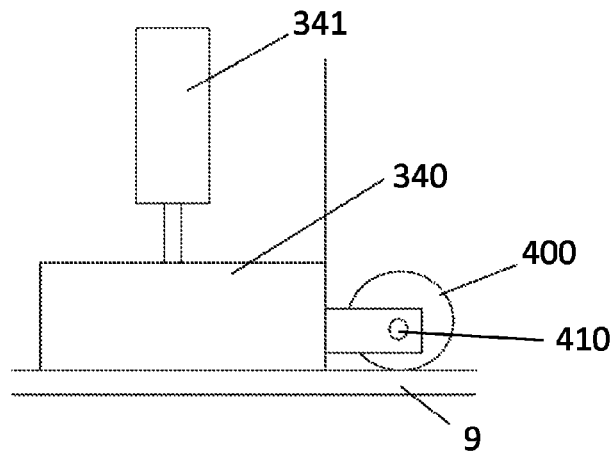
FIG. 8 is a schematic representation, side view, of the anti-extrusion system of the plug according to the invention.
Figure 9:
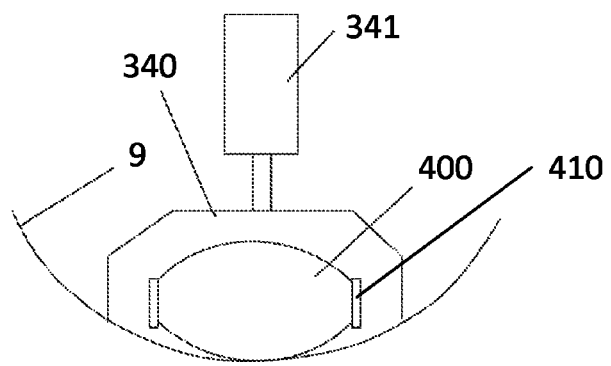
FIG. 9 is a schematic representation, frontal view, of the anti-extrusion system of FIG. 8.

For example, as illustrated in FIGS. 8 and 9, each blocking element of the anti-extrusion system may comprise a roller 400 mounted eccentrically 410 with respect to a non-slip pad 340 of the holding system. This roller 400 is arranged to have a contact surface intended to be in contact with the inner wall of the pipe 9.

Thus, if the plug were to be translationally moved in the pipe, for example in the event of failure of the system of holding by non-slip pads and in the event of excess pressure, the mounting of the roller 400 eccentrically 410 implies that the roller is going to turn until it applies a stress against the inner wall of the pipe 9 stopping the translation of the plug.

Such an anti-extrusion system may be used with a multi-element plug as presented above, but also with any other type of plug comprising a similar position holding system, based for example on the use of non-slip pads forced against the inner wall of the pipe.

In this respect, a closing device could thus be provided intended to seal and isolate a pipe 9 having an inner wall forming a substantially cylindrical cavity with a so-called first diameter, the closing device comprising:
- a main body 110 having substantially the shape of a cylinder with a so-called second diameter, the second diameter being smaller than the first diameter to allow the closing device to be inserted into the cavity; and
- sealing joint elements 120 that project around the side wall of the cylinder 110 defining the shape of the main body, so as to close a free space formed between the main body 110 and the inner wall of the pipe 9,
- a position holding system, which may for example comprise a plurality of non-slip pads (140; 340) translationally mounted in the main body to be deployed against the inner wall of the pipe 9 in order to assure a holding of the closing device by compression, the set of non-slip pads forming preferably an overall contact surface extending over at least half of the periphery of the section of the cylinder 110 defining the shape of the main body, and
- an anti-extrusion system as presented above, provided to prevent a translation of the closing device in the pipe 9 in the event of failure of the position holding system, said anti-extrusion system comprising preferably blocking elements 400 arranged to be activated during a translation movement of the closing device in the pipe 9.

The mounting of the plug 10 in the tank 1 takes place according to the following general steps:
1. Opening of the tank 1;
2. Introduction in the tank 1 of the different parts which make up the multi-element plug 10; through the manhole 7;
3. Assembly of the multi-element plug 10;
4. Putting in place the instrumentation system between the plug 10 and the manhole 7;
5. Pressurising the multi-element plug 10;
6. Filling the tank 1, pressurising the confined space, testing the tank 1, emptying the tank 1;
7. Depressurisation of the multi-element plug 10;
8. Removal of the instrumentation system;
9. Dismantling of the multi-element plug 10;
10. Evacuation of the different parts that make up the multi-element plug 10, through the manhole 7;
11. Closing the tank 1.

Step n °3 of assembling the multi-element plug 10 is detailed below for the case where the multi-element plug 10 is assembled directly in the pipe, which greatly facilitates its implementation, especially when the parts are heavy and when the diameter of the pipe is large.

The assembly steps for a plug as illustrated in FIGS. 2 and 3 may be the following:
- 3-1. Assembling the centring rod 142 on the assembly element 1112;
- 3-2. Positioning the assembly element 1112 perpendicularly to the axis of the pipework 9, in the vertical sense and taking care to centre it correctly by spreading out the clearances between the pipework and the structure of the two parts. The spreading out of the clearances and the blocking takes place preferably by means of screws-jack;
- 3-3. Assembling the assembly element 1111 on the assembly element 1112 (for example with a screw in the honeycomb structure);

3-4. Assembling the assembly element 1113 on the assembly element 1112 (for example with a screw in the honeycomb structure);
3-5. Applying the necessary effort on the non-slip pads 140 while ensuring the clearances are uniformly spread out between the parts and the pipework 9 and checking the force measurements;
3-6. Positioning a first inter-disc sealing joint 130;
3-7. Positioning a first inflatable sealing joint 120;
3-8. Assembling the assembly element 1121 on the elementary cylinder 111 formed by the assembly elements (1111,1112,1113) (for example with a screw in the honeycomb structure);
3-9. Assembling the assembly element 1122 on the assembly elements 1121, 1111, 1112, 1113 (for example with a screw in the honeycomb structure);
3-10. Assembling the assembly element 1123 on the assembly elements 1121, 1122, 1111, 1112, 1113 (for example with a screw in the honeycomb structure);
3-11. Pressurising the non-slip pads 140 against the walls while ensuring the clearances between the parts and the pipework 9 are uniformly spread out;
3-12. Positioning the second inter-disc sealing joint 130;
3-13. Positioning the second inflatable sealing joint 120;
3-14. Assembling the assembly element 1131 on the elementary cylinder 112 formed by the assembly elements (1121,1122,1123) (for example with a screw in the honeycomb structure);
3-15. Assembling the assembly element 1132 on the assembly elements 1131, 1121, 1122, 1123 (for example with a screw in the honeycomb structure);
3-16. Assembling the assembly element 1133 on the assembly elements 1131, 1132, 1121, 1122, 1123 (for example with a screw in the honeycomb structure);
3-17. Applying the necessary force on the non-slip pads 140 while ensuring the clearances between the parts and the pipework 9 are uniformly spread out and checking the force measurements;
3-18. Inserting the tie-rods 150 carefully through the assembly elements forming the elementary cylinders 112 and 113, and screwing them into the assembly elements forming the elementary cylinder 111;
3-19. Assembling if necessary the supporting flange system 151 and positioning the support flange 151 by means of contact pads 152 on the inlet of the tapping of the tank 1;
3-20. Screwing down the nuts onto the tie-rods 150 in order to block the support flange 151.

The assembly steps for a plug as illustrated in FIGS. 5, 6 and 7 may be the following:
3-1. Positioning the first non-slip pads 340 provided with force measurement sensors 342 and anti-expulsion elements 400;
3-2. Positioning the first jacks/screws-jacks 341;
3-3. Positioning the central axis 150;
3-4. Positioning the final pads 340 provided with force measurement sensors 342 and jacks/screws-jacks 341;
3-5. Pressurising the jacks 341 while controlling the forces by means of sensors 342;
3-6. Positioning the first sectorial honeycomb elements of one of the elementary cylinders 313;
3-7. Positioning a first inflatable sealing joint 120;
3-8. Positioning the second sectorial honeycomb elements of another of the elementary cylinders 312;
3-9. Positioning the second inflatable sealing joint 120;
3-10. Positioning the last sectorial honeycomb elements of the last of the elementary cylinders 311.

Step n °5 of pressurising the multi-element plug 10 may be broken down as follows:
5-1. Pressurising the first inflatable sealing joint 120;
5-2. Pressurising the second inflatable sealing joint 120;
5-3. Pressurising the inter-joint space;
5-4. Checking the stability of the three pressures, in order to check the intrinsic leak tightness of the plug 10.

As can be seen from the above, the multi-element plug 10 proposed is particularly advantageous, in the first instance since it enables the sealing of any type of pipe, whatever its diameter, without having to section such a pipe and may, for a wide pressure range, be positioned in a full pipework section without a holding device.

It may in fact be introduced into any tank thanks to its multi-element structure, and be used with any diameter of pipework. The closing device has in fact a final diameter after assembly greater than the diameter of the orifice of the manhole through which it will have been introduced.

The plug has been described with reference to the isolation of a tank, or of a set of tank(s) and pipe(s), where the manhole is cut in the tank. It is also possible to envisage using the plug for the isolation of pipes alone, of large diameter, which are provided with a manhole through which the multi-element plug 10 could be introduced.

If the plug proposed is particularly advantageous for the sealing of pipes having diameters greater than the diameter of the manhole, it may obviously also be used in pipes with diameters smaller than the diameter of the manhole. The multi-element structure enables in fact a much easier handling of the parts with a view to assembly.

With such a plug, the installation and removal times are markedly shorter than the installation and removal time of a welded plug. Moreover, no regulatory file is necessary, nor any non-destructive testing.

Moreover, the logistics requirement is very limited, and human resources qualified as "standard" are sufficient for putting in place the plug. Such a plug also makes it possible to dispense with hot work (grinding, welding, etc.) which eliminates the risks of fire.

Such a plug is further designed to withstand high pressure (for example resistance to 35 bars for a pipe of 1400 mm nominal diameter, and higher resistance for smaller nominal diameters) and without holding device to arrange outside of the pipe.

Moreover, this plug may be implemented in any type of industrial installation, including in installations at risk, such as for example nuclear power plants. Such a plug may thus be used in response to any problem "of isolation" of a reservoir, of a tank, of an exchanger or of a pipe of pipework with a view to carrying out a leak tightness test, hydraulic pressure testing or any other operation requiring leak tightness, especially for pipework having a large nominal diameter.

The reader will have understood that numerous modifications may be made without materially going beyond the novel teachings and advantages described herein. Consequently, all modifications of this type are intended to be incorporated within the scope of the closing device described.

BIBLIOGRAPHIC REFERENCES

WO 00/03172
US 2006/0086400

The invention claimed is:

1. Closing device for closing and isolating a pipe having an inner wall forming a substantially cylindrical cavity with a first diameter, the closing device comprising:
a main body having substantially a shape of a cylinder with a second diameter, the second diameter being smaller than the first diameter to allow the closing device to be inserted into the cavity; and
sealing joint elements that project around the side wall of the cylinder defining the shape of the main body, so as to close a free space formed between the main body and the inner wall of the pipe, wherein the main body comprises several assembly elements capable of being assembled together to form the cylinder defining the shape of the main body, each assembly element having a shape inscribed within a parallelepiped volume defined by three orthogonal dimensions, in which at least two of the three dimensions have a length smaller than the second diameter, and wherein the device further comprises a position holding system comprising a plurality of non-slip pads mounted in translation in some of the assembly elements to be deployed against the inner wall of the pipe in order to assure a holding of the closing device by compression, the set of non-slip pads forming an overall contact surface extending over at least half of the periphery of the section of the cylinder defining the shape of the main body, the position holding system further comprising force measurement elements provided to measure the force applied by the non-slip pads on the inner wall of the pipe.

2. Device according to claim 1, in which each non-slip pad is mounted on a compression system, such as a system of jacks or a screws-jacks system, comprising a blocking system preventing a translation of the non-slip pad after deployment of the non-slip pad on the inner wall of the pipe.

3. Device according to claim 1, further comprising an anti-extrusion system provided to prevent a translation of the closing device in the pipe in the event of failure of the position holding system, said anti-extrusion system comprising blocking elements arranged to be activated during a translation movement of the closing device in the pipe.

4. Device according to claim 3, in which each blocking element of the anti-extrusion system is a roller mounted eccentrically with respect to a non-slip pad of the holding system, and having a contact surface intended to be in contact with the inner wall of the pipe.

5. Device according to claim 1, in which the set of non-slip pads forms an overall contact surface extending over the totality of the periphery of the section of the cylinder defining the shape of the main body.

6. Device according to claim 1, in which the at least two dimensions among the three have a length smaller than or equal to half of the second diameter, preferably smaller than or equal to one third of the second diameter.

7. Device according to claim 1, in which the main body is segmented along chords of the circular section of the cylinder, several of the assembly elements forming circular segments of the cylinder.

8. Device according to claim 1, in which the main body is segmented along radiuses of the circular section of the cylinder, several of the assembly elements forming circular sectors of the cylinder.

9. Device according to claim 1, in which the main body is segmented along the section of the cylinder so as to form several elementary cylinders the assembly of which forms the cylinder of the main body.

10. Device according to claim 9, in which the main body comprises intrinsic sealing joints, each intrinsic sealing joint being arranged between two adjacent elementary cylinders.

11. Device according to claim 9, in which the main body is segmented into at least three elementary cylinders, each elementary cylinder being segmented into at least three assembly elements.

12. Device according to claim 9, in which the different non-slip pads of the holding system are mounted in assembly elements forming one of the elementary cylinders.

13. Device according to claim 1, in which the sealing joint elements comprise at least two inflatable sealing joints intended to be positioned around the cylinder forming the main body.

14. Device according to claim 13, further comprising an instrumentation system provided to command and control the pressure in the inflatable sealing joints and in each inter-joint space formed between two adjacent inflatable sealing joints and the walls of the main body and the duct.

15. Device according to claim 1, in which each assembly element has a honeycomb structure.

16. Device according to claim 1 for use in a tank having a manhole for handling assembly elements, the manhole having a diameter comprised between 400 mm and 600 mm, with a view to the sealing of a pipe having a diameter comprised between 1000 mm and 2000 mm.

* * * * *